US009052516B2

(12) United States Patent
Xie et al.

(10) Patent No.: US 9,052,516 B2
(45) Date of Patent: Jun. 9, 2015

(54) LENS DISPLAY DEVICE COMPRISING A POLARIZED SWITCH UNIT AND A SINGLE-REFRINGENT FILM LAYER, LIQUID CRYSTAL DISPLAY DEVICE AND DISPLAY DRIVE METHOD

(71) Applicant: Tianma Micro-Electronics Co., Ltd., Shenzhen (CN)

(72) Inventors: Jia Xie, Shenzhen (CN); Xiaolin Liu, Shenzhen (CN); Yongdong Zhang, Shenzhen (CN)

(73) Assignee: Tianma Micro-Electronics Co., Ltd., Shenzhen (CN)

( * ) Notice: Subject to any disclaimer, the term of this patent is extended or adjusted under 35 U.S.C. 154(b) by 0 days.

(21) Appl. No.: 14/109,761

(22) Filed: Dec. 17, 2013

(65) Prior Publication Data

US 2014/0362313 A1 Dec. 11, 2014

(30) Foreign Application Priority Data

Jun. 9, 2013 (CN) .......................... 2013 1 0230766

(51) Int. Cl.
*G02F 1/13* (2006.01)
*G02B 27/22* (2006.01)
*G02F 1/1335* (2006.01)
*G02F 1/29* (2006.01)

(52) U.S. Cl.
CPC .......... *G02B 27/2214* (2013.01); *G02F 1/1335* (2013.01); *G02F 1/29* (2013.01)

(58) Field of Classification Search
CPC .................................................. G02B 27/2214
USPC ............................................. 349/16, 95, 200
See application file for complete search history.

(56) References Cited

U.S. PATENT DOCUMENTS

2013/0002995 A1* 1/2013 Ohyama et al. ................. 349/96

FOREIGN PATENT DOCUMENTS

CN 101114055 A 1/2008

* cited by examiner

*Primary Examiner* — Paul Lee
(74) *Attorney, Agent, or Firm* — Kilpatrick Townsend & Stockton LLP

(57) ABSTRACT

A lens display device is disclosed. The device includes an optical thin film layer, a polarized switch unit, and a display unit emitting light. The optical thin film layer includes a single-refringent film layer, and first and second liquid crystal lens arrays on the single-refringent film layer. The arrays are positioned such that the lens elements of the first array are misaligned from the lens elements of the second array by half of the lens period. The polarized switch unit, when operative, polarizes the light emitting from the display unit into ordinary light entering the first liquid crystal lens array and into unordinary light entering the second liquid crystal lens array. In addition, when inoperative, the polarized switch unit polarizes the light emitting from the display unit into unordinary light entering the first liquid crystal lens array and into ordinary light entering the second liquid crystal lens array.

11 Claims, 6 Drawing Sheets

LENS DISPLAY DEVICE COMPRISING A POLARIZED SWITCH UNIT AND A SINGLE-REFRINGENT FILM LAYER, LIQUID CRYSTAL DISPLAY DEVICE AND DISPLAY DRIVE METHOD

This application claims the benefit of priority to Chinese Patent Application No. 201310230766.4, filed with the Chinese Patent Office on Jun. 9, 2013, and entitled "LENS DISPLAY DEVICE, LIQUID CRYSTAL DISPLAY DEVICE AND DISPLAY DRIVE METHOD", the contents of which is incorporated herein by reference in its entirety.

FIELD OF THE INVENTION

The present invention relates to the field of liquid crystal displays and particularly to a lens display device, a liquid crystal display device and a display drive method.

BACKGROUND OF THE INVENTION

Since there is a nuance between an object perceived by the right eye of a person and the same object perceived by the left eye, a 3D image of the object can be further recognized by sensing the depth of the object due to the nuance, and this nuance is also referred to a parallax.

Along with the development of sciences and technologies, a 3D display technology emerges from the parallax of an object perceived by human eyes, that is, with the 3D display technology, a parallax between the left and right eyes of a person is produced artificially by feeding two images with the parallax respectively to the left and right eyes of the person so that the feeling of observing a real 3D object can be produced after the brain of the person obtains the different images perceived by the left and right eyes.

In a practical application, a birefringent lens 3D display has been produced with the 3D display technology as illustrated in FIG. 1 showing a schematic structural diagram of the birefringent lens 3D display. As can be apparent from FIG. 1, the birefringent lens 3D display is consisted of an optical thin film layer, a polarized switch and a display screen.

Specifically the optical thin film layer is composed of a single-refringent substance and a liquid crystal polymer with a positive birefringent function, where the single-refringent substance has a refractive index of n, which is the same as a refractive index $n_0$ of the liquid crystal polymer receiving ordinary light, and the single-refringent substance is shaped in a concave lens array; and the liquid crystal polymer has two refractive indexes, one of which is the refractive index $n_0$ with respect to ordinary light, and the other of which is a refractive index $n_e$ with respect to unordinary light, and $n_0$ is below $n_e$.

The polarized switch is a liquid crystal box composed of two transparent plates, to the inner sides of which, thin layers of an electrically conductive substance are attached, where the thin layers of the electrically conductive substance are coated thereon with orientated layers with orientations perpendicular to each other, and there are nematic phase liquid crystals twisted 90° between the two orientated layers.

The display screen can be a liquid crystal display emitting polarized light or another type of display with a polarization sheet.

As illustrated in FIG. 2, there is shown a schematic structural diagram of an operating principle of the birefringent lens 3D display. Specifically, the operating principle of the birefringent lens 3D display is as follows:

When the polarized switch is not driven, the liquid crystal polymer and the single-refringent substance have the same refractive index with respect to incident light, thus the optical thin film has no light focusing effect, and at this time the birefringent lens 3D display operates in a 2D mode; and When the polarized switch is driven, the liquid crystal polymer has a larger refractive index with respect to incident light than that of the single-refringent substance with respect to incident light, thus the optical thin film has a light focusing effect, and at this time the birefringent lens 3D display operates in a 3D mode.

In view of this, the birefringent lens 3D display has the advantages of a low loss of brightness, fast switching of the 2D/3D modes, etc. However a display in the 3D mode is presented by generating the effect of a columnar lens array under the principle of the refractive index of the liquid crystal polymer with respect to incident light being larger than that of the single-refringent substance with respect to incident light and by utilizing a light splitting function of the columnar lens array to have a half of pixels perceived respectively by the left and right eyes of the person, so that the resolution of an image of the birefringent lens 3D display operating in the 3D mode can be only a half of that of the image in the 2D mode and consequently a display quality of the birefringent lens 3D display may be lowered.

BRIEF SUMMARY OF THE INVENTION

One inventive aspect is a lens display device. The lens display device includes an optical thin film layer, a polarized switch unit, and a display unit configured to emit emergent light. The optical thin film layer includes a single-refringent film layer, and first and second liquid crystal lens arrays on the single-refringent film layer, where each of the first and second liquid crystal lens arrays includes a plurality of liquid crystal lens elements arranged consecutively and with a same lens period. The first and second liquid crystal lens arrays are positioned on the single-refringent film layer such that the lens elements of the first liquid crystal lens array are misaligned from the lens elements of the second liquid crystal lens array by half of the lens period, and a direction of the liquid crystals included in each liquid crystal lens element of the first liquid crystal lens array is perpendicular to a direction in which the emergent light is polarized in the display unit. In addition, a direction of the liquid crystals included in each liquid crystal lens element of the second liquid crystal lens array is parallel to the direction in which the emergent light is polarized in the display unit. The polarized switch unit is configured, when operative, to polarize the emergent light emitting from the display unit into ordinary light entering the first liquid crystal lens array and to polarize the emergent light emitting from the display unit into unordinary light entering the second liquid crystal lens array. In addition, when inoperative, the polarized switch unit is configured to polarize the emergent light emitting from the display unit into unordinary light entering the first liquid crystal lens array and to polarize the emergent light emitting from the display unit into ordinary light entering the second liquid crystal lens array.

DETAILED DESCRIPTION OF THE INVENTION

Figure 1:
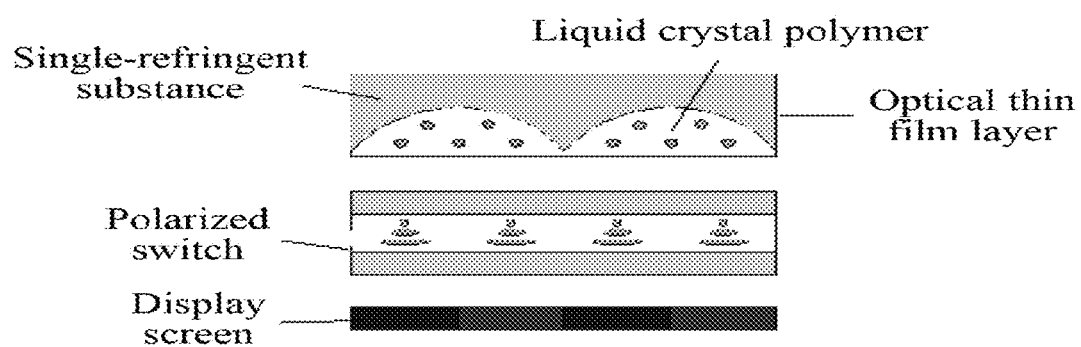
FIG. 1 is a schematic structural diagram of a birefringent lens 3D display.
Figure 2:
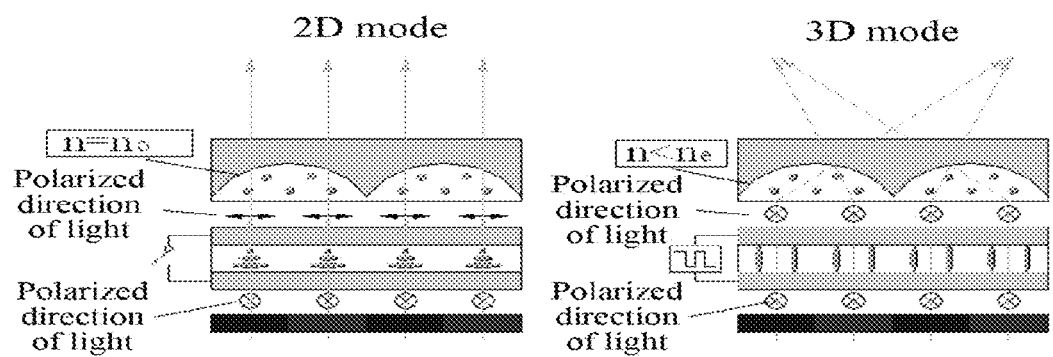
FIG. 2 is a schematic structural diagram of an operating principle of the birefringent lens 3D display.

In order to attain the object of the invention, embodiments of the invention provide a lens display device, a liquid crystal display device and a display drive method, and the lens display device includes an optical thin film layer, a polarized switch unit and a display unit configured to emit emergent light, where the optical thin film layer includes a single-refringent film layer, and a first liquid crystal lens array and a second liquid crystal lens array solidified on the single-refringent film layer, and each liquid crystal lens array includes liquid crystal lens elements arranged consecutively and with the same lens period; the first liquid crystal lens array is mapped on the single-refringent film layer in a location interval at a mapped location, of the liquid crystal lens elements, which is different by a half of the lens period from a mapped location, of the liquid crystal lens elements, where the second liquid crystal lens array is mapped on the single-refringent film layer in the location interval, in the direction in which the liquid crystal lens elements are arrayed in each liquid crystal lens array; and the direction in which liquid crystals included in each liquid crystal lens element are arrayed in the first liquid crystal lens array is perpendicular to the direction in which the emergent light is polarized in the display unit, and the direction in which liquid crystals included in each liquid crystal lens element are arrayed in the second liquid crystal lens array is parallel to the direction in which the emergent light is polarized in the display unit, so that when the polarized direction is switched, the emergent light through the polarized switch is subject to a light splitting effect of the lens on only one thin film layer, and since the two layers of liquid crystal lens arrays are different by a half of the lens period, the emergent light through the optical thin film layer has pixels visible to the left and right eyes interchangeable; and Upon being triggered into being operative, the emergent light emitting from the display unit is polarized into ordinary light entering the first liquid crystal lens array, and the emergent light emitting from the display unit is polarized into unordinary light entering the second liquid crystal lens array; and upon being triggered into being inoperative, the emergent light emitting from the display unit is polarized into unordinary light entering the first liquid crystal lens array, and the emergent light emitting from the display unit is polarized into ordinary light entering the second liquid crystal lens array, so that a picture of pixels in odd columns for the left eye enters the left eye in a first half of a lens period, and the picture of pixels in even columns for the left eye enters the left eye in a second half of the lens period, while a picture for the right eye is the same, thereby performing a naked-eye 3D display at a full resolution.

Respective embodiments of the invention will be detailed below with reference to the drawings.

First Embodiment

Figure 3:
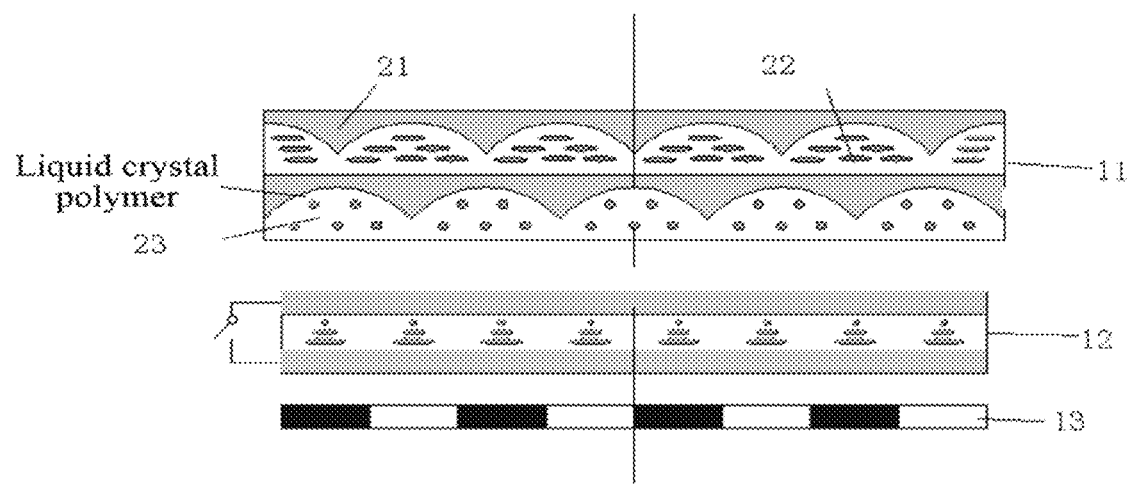
FIG. 3 is a schematic structural diagram of a lens display device to which a first embodiment of the invention relates.

As illustrated in FIG. 3 showing a schematic structural diagram of a lens display device to which the first embodiment of the invention relates, and the lens display device includes an optical thin film layer 11, a polarized switch unit 12 and a display unit 13 configured to emit emergent light, where:

The optical thin film layer 11 includes a single-refringent film layer 21, and a first liquid crystal lens array 22 and a second liquid crystal lens array 23 solidified on the single-refringent film layer, and each liquid crystal lens array includes liquid crystal lens elements arranged consecutively and with the same lens period.

The first liquid crystal lens array is mapped on the single-refringent film layer in a location interval at a mapped location, of the liquid crystal lens elements, which is different by a half of the lens period from a mapped location, of the liquid crystal lens elements, where the second liquid crystal lens array is mapped on the single-refringent film layer in the location interval, in the direction in which the liquid crystal lens elements are arrayed in each liquid crystal lens array.

The direction in which liquid crystals included in each liquid crystal lens element are arrayed in the first liquid crystal lens array is perpendicular to the direction in which the emergent light is polarized in the display unit, and the direction in which liquid crystals included in each liquid crystal lens element are arrayed in the second liquid crystal lens array is parallel to the direction in which the emergent light is polarized in the display unit.

Particularly the lens period of a liquid crystal lens is:

$$p = \frac{2\ ml}{l+d}$$

Where p is the lens period of the liquid crystal lens, m is a horizontal spacing of pixels in the display unit, l is a distance parameter, and d is the distance of the display unit from the optical center of the liquid crystal lens element.

Preferably l is the distance of a preset optimum observation location from the display unit, which is a constant value.

Particularly the first liquid crystal lens element is solidified on the single-refringent thin film layer at a location which does not overlap with the location where the second liquid crystal lens element is solidified on the single-refringent thin film layer.

Figure 4:
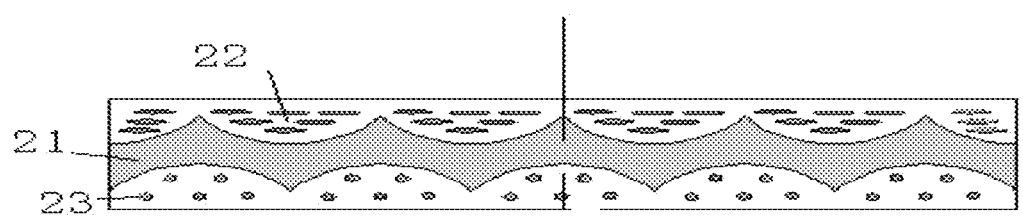
FIG. 4 is a schematic structural diagram of a first liquid crystal lens array and a second liquid crystal lens array solidified on a single-refringent film layer.

Preferably as illustrated in FIG. 4, there is a schematic structural diagram of the first liquid crystal lens array and the second liquid crystal lens array solidified on the single-refringent film layer.

Specifically the first liquid crystal lens array and the second liquid crystal lens array are solidified on the single-refringent film layer as follows:

The first liquid crystal lens array and the second liquid crystal lens array are solidified on the same single-refringent film layer, where a concave face of each liquid crystal lens element in the first liquid crystal lens array solidified on the single-refringent film layer is oriented in a direction opposite to the direction in which a concave face of each liquid crystal lens element in the second liquid crystal lens array solidified on the single-refringent film layer is oriented.

Figure 5:
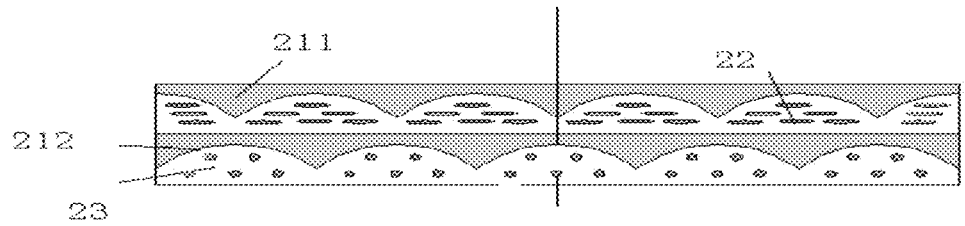
FIG. 5 is a schematic structural diagram of a first liquid crystal lens array and a second liquid crystal lens array solidified on a single-refringent film layer.

As illustrated in FIG. 5, there is a schematic structural diagram of the first liquid crystal lens array and the second liquid crystal lens array solidified on the single-refringent film layer.

Specifically the first liquid crystal lens array and the second liquid crystal lens array are solidified on the single-refringent film layer as follows:

The first liquid crystal lens array 22 and the second liquid crystal lens array 23 are solidified on different single-refringent film layers, where a concave face of each liquid crystal lens element in the first liquid crystal lens array 22 solidified on the first single-refringent film layer 211 is oriented in the same direction as the direction in which a concave face of each liquid crystal lens element in the second liquid crystal lens array 23 solidified on the second single-refringent film layer 212 is oriented; and The first single-refringent film layer 211 and the second single-refringent film layer 212 are stacked into the optical thin film layer.

Figure 6:
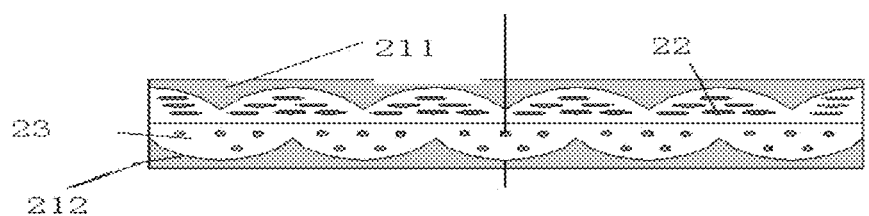
FIG. 6 is a schematic structural diagram of a first liquid crystal lens array and a second liquid crystal lens array solidified on a single-refringent film layer.

As illustrated in FIG. 6, there is a schematic structural diagram of the first liquid crystal lens array and the second liquid crystal lens array solidified on the single-refringent film layer.

Specifically the first liquid crystal lens array and the second liquid crystal lens array are solidified on the single-refringent film layer as follows:

The first liquid crystal lens array 22 and the second liquid crystal lens array 23 are solidified on different single-refringent film layers, where a concave face of each liquid crystal lens element in the first liquid crystal lens array solidified on the first single-refringent film layer 211 is oriented in a direction opposite to the direction in which a concave face of each liquid crystal lens element in the second liquid crystal lens array solidified on the second single-refringent film layer 212 is oriented; and The first single-refringent film layer and the second single-refringent film layer are stacked into the optical thin film layer on a side where the liquid crystal lens arrays are solidified.

Specifically the first liquid crystal lens array and the second liquid crystal lens array have their mapped locations different by a half of the lens period after being mapped perpendicularly onto the same plane parallel to the optical thin film layer.

Figure 7:
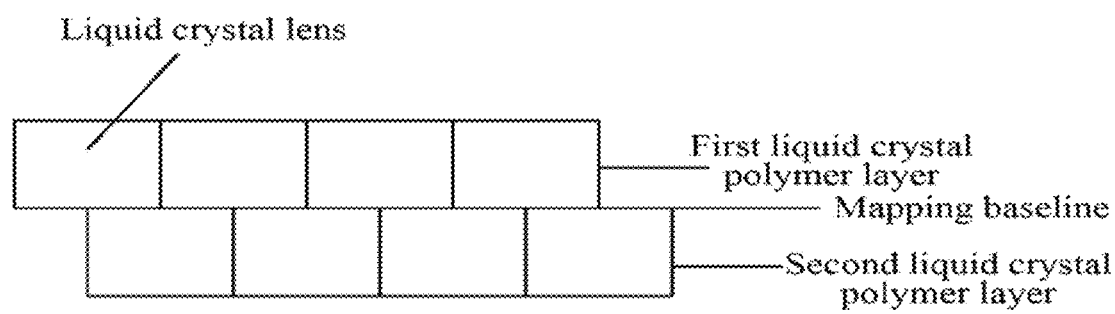
FIG. 7 is a schematic structural diagram of the two liquid crystal lens arrays on the single-refringent film layer in the same location interval with their mapped locations being different by a half of the lenses period along the solidified direction.

As illustrated in FIG. 7, there is shown a schematic structural diagram of the first liquid crystal lens array and the second liquid crystal lens array with their mapped locations different by a half of the lens period after being mapped perpendicularly onto the same plane parallel to the optical thin film layer.

The polarized switch unit 12 is configured, upon being driven and triggered into being operative, to polarize the emergent light emitting from the display unit into ordinary light entering the first liquid crystal lens array of the optical thin film layer and to polarize the emergent light emitting from the display unit into unordinary light entering the second liquid crystal lens array of the optical thin film layer; and upon being driven and triggered into being inoperative, to polarize the emergent light emitting from the display unit into unordinary light entering the first liquid crystal lens array of the optical thin film layer and to polarize the emergent light emitting from the display unit into ordinary light entering the second liquid crystal lens array of the optical thin film layer.

Figure 8A:
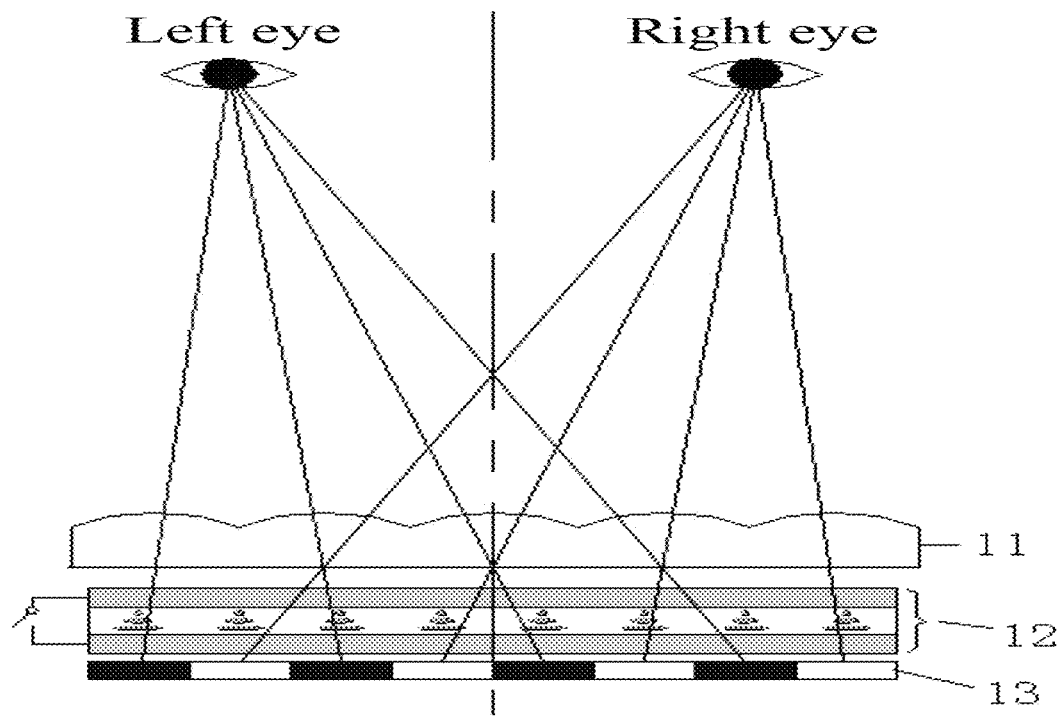
FIG. 8(a) is a schematic structural diagram of a display of images for the left and right eyes in a first half of a drive period.

As illustrated in FIG. 8(a), there is shown a schematic structural diagram of a display of images for the left and right eyes in a first half of a drive period.

The display unit displays odd columns of the image for the left eye and even columns of the image for the right eye in the first half of the drive period. When the polarized switch unit becomes inoperative in the first half of the drive period, the optical thin film has a light focusing effect in the first half of the drive period, so that the odd columns of the image for the left eye enter the left eye in the first half of the drive period, and the even columns of the image for the right eye enter the right eye in the first half of the drive period.

Figure 8B:
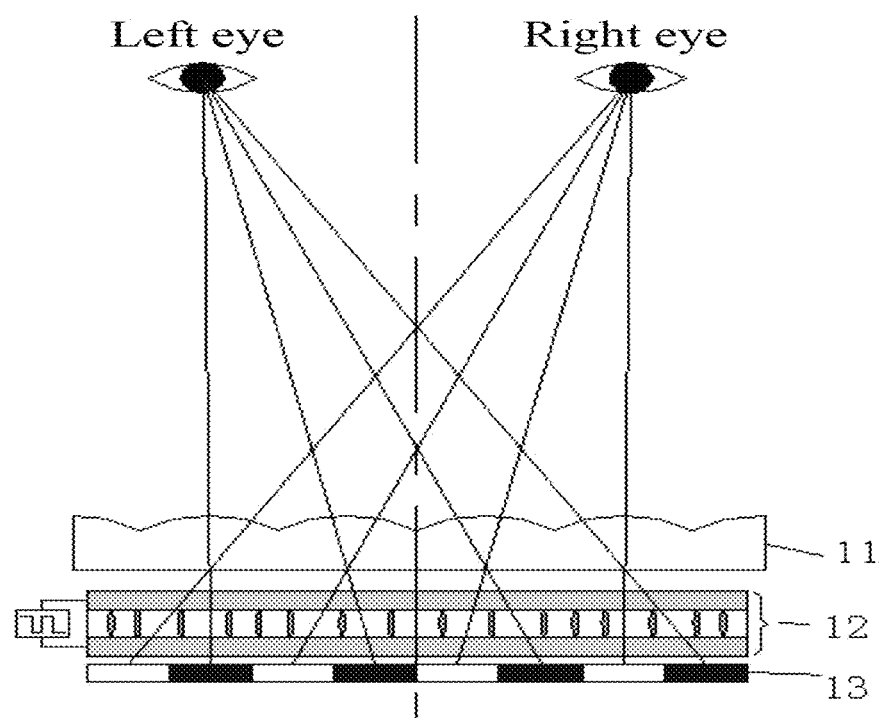
FIG. 8(b) is a schematic structural diagram of a display of the images for the left and right eyes in a second half of the drive period.

As illustrated in FIG. 8(b), there is shown a schematic structural diagram of a display of images for the left and right eyes in a second half of the drive period.

The display unit displays even columns of the image for the left eye and odd columns of the image for the right eye in the second half of the drive period. When the polarized switch unit becomes operative in the second half of the drive period, the optical thin film has a light focusing effect in the second half of the drive period, so that the even columns of the image for the left eye enter the left eye in the second half of the drive period, and the odd columns of the image for the right eye enter the right eye in the second half of the drive period.

As can be apparent in connection with FIG. 8(a) and FIG. 8(b) together, a naked-eye 3D display at a full resolution can be performed with the solution according to the embodiment of the invention.

It shall be noted that ordinary light as referred to in the embodiment of the invention refers to the light obeying the refraction law among the two beams of light subject to a birefringent phenomenon while light propagates through a single-axis crystal. Unordinary light refers to the light disobeying the refraction law among the two beams of light subject to the birefringent phenomenon while light propagates through the single-axis crystal.

A lens display device to which the solution according to the first embodiment of the invention relates includes an optical thin film layer, a polarized switch unit and a display unit configured to emit emergent light, where the optical thin film layer includes a single-refringent film layer, and a first liquid crystal lens array and a second liquid crystal lens array solidified on the single-refringent film layer, and each liquid crystal lens array includes liquid crystal lens elements arranged consecutively and with the same lens period; where the first liquid crystal lens array is mapped on the single-refringent film layer in a location interval at a mapped location, of the liquid crystal lens elements, which is different by a half of the lens period from a mapped location, of the liquid crystal lens elements, where the second liquid crystal lens array is mapped on the single-refringent film layer in the location interval, in the direction in which the liquid crystal lens elements are arrayed in each liquid crystal lens array; and the direction in which liquid crystals included in each liquid crystal lens element are arrayed in the first liquid crystal lens array is perpendicular to the direction in which the emergent light is polarized in the display unit, and the direction in which liquid crystals included in each liquid crystal lens element are arrayed in the second liquid crystal lens array is parallel to the direction in which the emergent light is polarized in the display unit, so that when the polarized direction is switched, the emergent light through the polarized switch is subject to a light splitting effect of the lens on only one thin film layer, and since the two layers of liquid crystal lens arrays are different by a half of the lens period, the emergent light through the optical thin film layer has pixels visible to the left and right eyes interchangeable; and When the polarized switch unit is driven and triggered into being operative, the emergent light emitting from the display unit is polarized into ordinary light entering the first liquid crystal lens array of the optical thin film layer, and the emergent light emitting from the display unit is polarized into unordinary light entering the second liquid crystal lens array of the optical thin film layer; and when the polarized switch unit is driven and triggered into being inoperative, the emergent light emitting from the display unit is polarized into unordinary light entering the first liquid crystal lens array of the optical thin film layer, and the emergent light emitting from the display unit is polarized into ordinary light entering the second liquid crystal lens array of the optical thin film layer, so that a picture of pixels in odd columns for the left eye enters the left eye in a first half of the lens period, and the picture of pixels in even columns for the left eye enters the left eye in a second half of the lens period, while a picture for the right eye is the same, thereby performing a naked-eye 3D display at a full resolution.

Second Embodiment

The second embodiment of the invention provides a liquid crystal display device including the lens display device according to the first embodiment of the invention.

Third Embodiment

Figure 9:
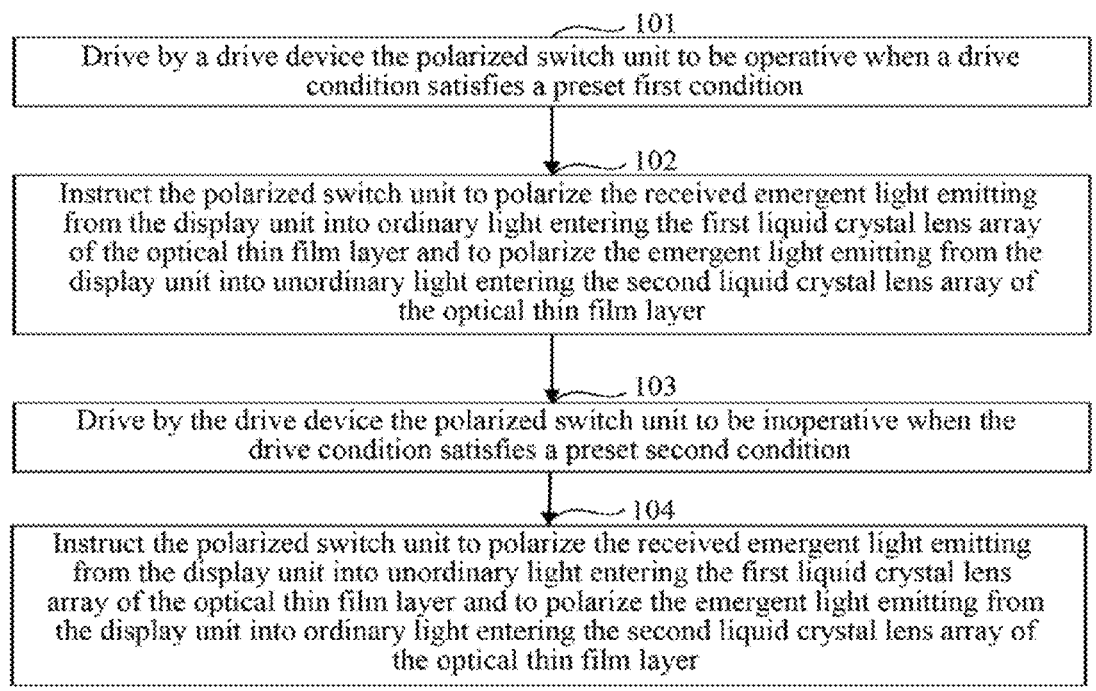
FIG. 9 is a schematic flow chart of a display drive method according to a third embodiment of the invention.

As illustrated in FIG. 9, there is shown a schematic flow chart of a display drive method according to the third embodiment of the invention, and the method includes:

The step 101 is to drive by a drive device the polarized switch unit to be operative when a drive condition satisfies a preset first condition.

The step 102 is to instruct the polarized switch unit to polarize the received emergent light emitting from the display unit into ordinary light entering the first liquid crystal lens array of the optical thin film layer and to polarize the emergent light emitting from the display unit into unordinary light entering the second liquid crystal lens array of the optical thin film layer.

The step 103 is to drive by the drive device the polarized switch unit to be inoperative when the drive condition satisfies a preset second condition.

The step 104 is to instruct the polarized switch unit to polarize the received emergent light emitting from the display unit into unordinary light entering the first liquid crystal lens array of the optical thin film layer and to polarize the emergent light emitting from the display unit into ordinary light entering the second liquid crystal lens array of the optical thin film layer.

Where the preset first condition is that an operating period of the display unit arrives; and the preset second condition is that the polarized switch unit has been operative for a period of time reaching a half of the operating period.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

What is claimed is:

1. A lens display device, comprising:
an optical thin film layer;
a polarized switch unit; and
a display unit configured to emit emergent light,
wherein the optical thin film layer comprises:
a single-refringent film layer, and
first and second liquid crystal lens arrays on the single-refringent film layer, wherein each of the first and second liquid crystal lens arrays comprises a plurality of liquid crystal lens elements arranged consecutively and with a same lens period,
wherein the first and second liquid crystal lens arrays are positioned on the single-refringent film layer such that the lens elements of the first liquid crystal lens array are misaligned from the lens elements of the second liquid crystal lens array by half of the lens period,
wherein a direction of the liquid crystals included in each liquid crystal lens element of the first liquid crystal lens array is perpendicular to a direction in which the emergent light is polarized in the display unit, and a direction of the liquid crystals included in each liquid crystal lens element of the second liquid crystal lens array is parallel to the direction in which the emergent light is polarized in the display unit,
wherein the polarized switch unit is configured, when operative, to polarize the emergent light emitting from the display unit into ordinary light entering the first liquid crystal lens array and to polarize the emergent light emitting from the display unit into unordinary light entering the second liquid crystal lens array, and when inoperative, to polarize the emergent light emitting from the display unit into unordinary light entering the first liquid crystal lens array and to polarize the emergent light emitting from the display unit into ordinary light entering the second liquid crystal lens array.

2. The device according to claim 1, wherein the lens period of the liquid crystal lens elements is:

$$p = \frac{2\,ml}{l+d}$$

wherein p is the lens period of the liquid crystal lens elements, m is a horizontal spacing of pixels in the display unit, l is a distance parameter, and d is a distance of the display unit from an optical center of the liquid crystal lens elements.

3. The device according to claim 1, wherein the first liquid crystal lens array and the second liquid crystal lens array are solidified on the same single-refringent film layer, and wherein a concave face of each liquid crystal lens element in the first liquid crystal lens array is oriented in a direction opposite to a direction in which a concave face of each liquid crystal lens element in the second liquid crystal lens array is oriented.

4. The device according to claim 2, wherein the first liquid crystal lens array and the second liquid crystal lens array are solidified on the same single-refringent film layer, and wherein a concave face of each liquid crystal lens element in the first liquid crystal lens array is oriented in a direction opposite to a direction in which a concave face of each liquid crystal lens element in the second liquid crystal lens array is oriented.

5. The device according to claim 1, wherein the first liquid crystal lens array and the second liquid crystal lens array are solidified on different single-refringent film layers, and wherein a concave face of each liquid crystal lens element in the first liquid crystal lens array is oriented in the same direction as a direction in which a concave face of each liquid crystal lens element in the second liquid crystal lens array is oriented; and
the first single-refringent film layer and the second single-refringent film layer are stacked into the optical thin film layer.

6. The device according to claim 2, wherein the first liquid crystal lens array and the second liquid crystal lens array are solidified on different single-refringent film layers, and wherein a concave face of each liquid crystal lens element in the first liquid crystal lens array is oriented in the same direction as a direction in which a concave face of each liquid crystal lens element in the second liquid crystal lens array is oriented; and the first single-refringent film layer and the second single-refringent film layer are stacked into the optical thin film layer.

7. The device according to claim 1, wherein the first liquid crystal lens array and the second liquid crystal lens array are solidified on different single-refringent film layers such that:

a concave face of each liquid crystal lens element in the first liquid crystal lens array is oriented in a direction opposite to the direction in which a concave face of each liquid crystal lens element in the second liquid crystal lens array is oriented; and the first single-refringent film layer and the second single-refringent film layer are stacked into the optical thin film layer on a side where the liquid crystal lens arrays are solidified.

8. The device according to claim 2, wherein the first liquid crystal lens array and the second liquid crystal lens array are solidified on different single-refringent film layers in such that:

a concave face of each liquid crystal lens element in the first liquid crystal lens array is oriented in a direction opposite to the direction in which a concave face of each liquid crystal lens element in the second liquid crystal lens array is oriented; and the first single-refringent film layer and the second single-refringent film layer are stacked into the optical thin film layer on a side where the liquid crystal lens arrays are solidified.

9. A liquid crystal display, comprising the lens display device according to claim 1.

10. A method of driving the lens display device according to claim 1 to display, comprising:

when a drive condition satisfies a preset first condition,
driving by a drive device the polarized switch unit to be operative, and
instructing the polarized switch unit to polarize the received emergent light emitting from the display unit into ordinary light entering the first liquid crystal lens array of the optical thin film layer and to polarize the emergent light emitting from the display unit into unordinary light entering the second liquid crystal lens array of the optical thin film layer; and when the drive condition satisfies a preset second condition,
driving by the drive device the polarized switch unit to be inoperative, and
instructing the polarized switch unit to polarize the received emergent light emitting from the display unit into unordinary light entering the first liquid crystal lens array of the optical thin film layer and to polarize the emergent light emitting from the display unit into ordinary light entering the second liquid crystal lens array of the optical thin film layer.

11. The method according to claim 10, wherein the preset first condition is that an operating period of the display unit occurs, and wherein the preset second condition is that the polarized switch unit has been operative for a period of time reaching half of the operating period.

* * * * *